(12) United States Patent
Siddique et al.

(10) Patent No.: US 11,841,522 B2
(45) Date of Patent: Dec. 12, 2023

(54) ON-CHIP SIMULTANEOUS FULL STOKES POLARIZATION (LINEAR + CIRCULAR) AND (MULTI/HYPER) SPECTRAL IMAGING

(71) Applicant: Samsung Electronics Co., Ltd., Suwon-si (KR)

(72) Inventors: Radwanul Hasan Siddique, Pasadena, CA (US); Haeri Park Hanania, San Gabriel, CA (US)

(73) Assignee: SAMSUNG ELECTRONICS CO., LTD.

( * ) Notice: Subject to any disclaimer, the term of this patent is extended or adjusted under 35 U.S.C. 154(b) by 510 days.

(21) Appl. No.: 16/899,574

(22) Filed: Jun. 11, 2020

(65) Prior Publication Data

US 2021/0311240 A1    Oct. 7, 2021

Related U.S. Application Data

(60) Provisional application No. 63/005,199, filed on Apr. 3, 2020.

(51) Int. Cl.
*G01J 3/02*      (2006.01)
*G01J 3/28*      (2006.01)
(Continued)

(52) U.S. Cl.
CPC .......... *G02B 5/3058* (2013.01); *G01J 3/0224* (2013.01); *G02B 26/06* (2013.01);
(Continued)

(58) Field of Classification Search
CPC ........ G02B 5/3058; G02B 1/002; G02B 1/02; G02B 1/04; G02B 5/20; G02B 5/201;
(Continued)

(56) References Cited

U.S. PATENT DOCUMENTS

2009/0021598 A1    1/2009  McLean et al.
2012/0154919 A1*   6/2012  Hu .................... G02B 5/003
                                                       216/2

(Continued)

FOREIGN PATENT DOCUMENTS

| CN | 102879097 B | 5/2015 |
| CN | 106154388 B | 7/2018 |
| WO | 2008068753 A2 | 6/2008 |

*Primary Examiner* — Ryan S Dunning
(74) *Attorney, Agent, or Firm* — Renaissance IP Law Group LLP

(57) ABSTRACT

An image sensor includes polarizing filters and spectral filters that provide on-chip simultaneous full Stokes polarization parameters (both linear and circular polarization) and multi/hyper spectral imaging. A polarizing filter polarizes incident light into a predetermined linear direction. The light-polarizing filter includes a wire grid and an array of phase-modulating nanostructures. The wire grid includes at least one wire that includes a series of metal-insulator-metal wire structures. The array of phase-modulating nanostructures is formed on the wire grid and changes a phase of the incident light a predetermined amount. A phase-modulating nanostructure is a high-dielectric-index nanostructure that changes of incident light based on a first width and a second width of the phase-modulating nanostructure in which the first width is perpendicular to the second width.

20 Claims, 10 Drawing Sheets

(51) Int. Cl.
*G02B 5/30* (2006.01)
*G02B 26/06* (2006.01)
*G02B 27/28* (2006.01)
*G02B 5/00* (2006.01)

(52) U.S. Cl.
CPC .... *G02B 27/286* (2013.01); *G01J 2003/2806* (2013.01); *G01J 2003/2826* (2013.01); *G02B 5/008* (2013.01); *G02B 2207/101* (2013.01)

(58) Field of Classification Search
CPC ...... G02B 5/207; G02B 5/3083; G02B 26/06; G02B 27/0068; G02B 27/0087; G02B 27/286; G02B 2207/101; G02F 1/133548; G02F 2203/50; G01J 3/0224; G01J 3/0264; G01J 3/26; G01J 3/2803; G01J 2003/2806; G01J 3/2823; G01J 2003/2826; G01J 4/04; G03F 7/001
See application file for complete search history.

(56) References Cited

U.S. PATENT DOCUMENTS

| | | | |
|---|---|---|---|
| 2017/0199391 A1* | 7/2017 | Otsuka | G02B 5/3083 |
| 2019/0025641 A1* | 1/2019 | Zhao | G02F 1/1368 |
| 2020/0081287 A1* | 3/2020 | Sugawara | G02B 5/3058 |
| 2021/0190593 A1* | 6/2021 | Yao | G02B 5/3083 |
| 2021/0247611 A1* | 8/2021 | Hudman | G02F 1/133538 |
| 2021/0333151 A1* | 10/2021 | Miyata | G01J 4/04 |
| 2021/0348969 A1* | 11/2021 | Yao | G02B 5/201 |

* cited by examiner

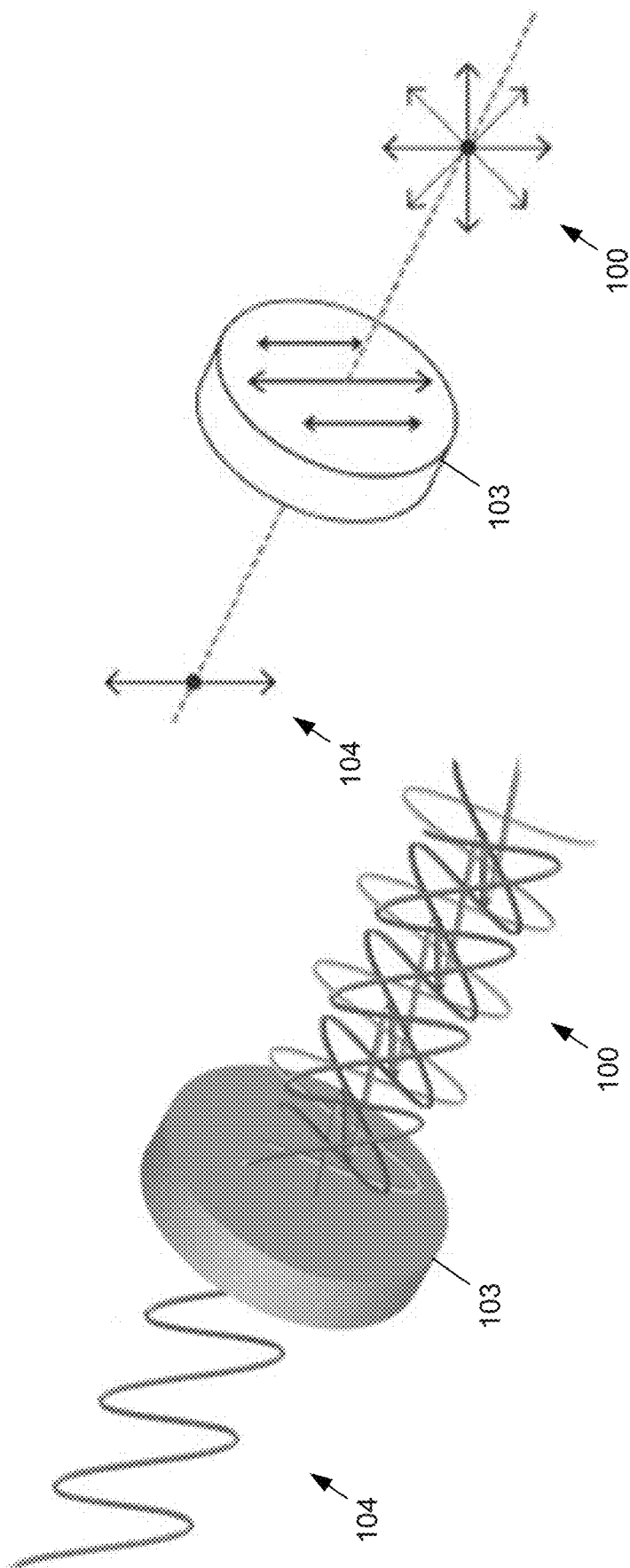

ON-CHIP SIMULTANEOUS FULL STOKES POLARIZATION (LINEAR + CIRCULAR) AND (MULTI/HYPER) SPECTRAL IMAGING

CROSS-REFERENCE TO RELATED APPLICATION

This application claims the priority benefit under 35 U.S.C. § 119(e) of U.S. Provisional Application No. 63/005,199, filed on Apr. 3, 2020, the disclosure of which is incorporated herein by reference in its entirety.

TECHNICAL FIELD

The subject matter disclosed herein relates to image sensors. More specifically, the subject matter disclosed herein relates to an image sensor having polarizing filters and spectral filters that provide on-chip simultaneous full Stokes polarization parameters (both linear and circular polarization) and multi/hyper spectral imaging.

BACKGROUND

Polarization is a property of light that indicates the geometrical orientation of the oscillations, or vibrations, of the electromagnetic (EM) fields of the light. The EM vibrations may be directed to a specific direction using a polarizer or a polarizing filter. FIG. 1A depicts unpolarized light 100 passing through a horizontally polarized filter 101. The light 102 that passes through the horizontally polarizing filter 101 is horizontally polarized. FIG. 1B depicts an equivalent representation of FIG. 1A. FIG. 1C depicts unpolarized light 100 passing through a vertically polarizing filter 103. The light 104 that passes through the vertically polarizing filter 103 is vertically polarized. FIG. 1D depicts an equivalent representation of FIG. 1C. The polarizing filters 101 and 103 may also be referred to as linear polarizers.

The polarizing filters 101 and 103 may alternatively be oriented in other directions, in which case the light passing through the polarizing filter will have an orientation corresponding to the orientation of the polarizing filter. Light may also be circularly polarized. FIG. 1E depicts an example in which light 105 has been circularly polarized. If, for example, the circularly polarized light 105 passes through a quarter wave plate 106, the light becomes linearly polarized light 107, which then may be further filtered, or polarized, by a linear polarizer 108.

The general polarization of light may be in the horizontal, or x direction, or in the vertical, or y direction, with a phase $\phi$ between the x and y axes. By determining the amplitude of electric field in, for example, x and y directions and the relative phase between the x and y direction, a full Stokes polarization state of the light may be determined.

Detection of the polarization of light may be used for ranging an object in poor visibility conditions, for example, in an advanced driver-assistance system (ADAS). Detection of the polarization of light may also be used to detect a specular surface, that is, whether a point on a surface is level with another point. After reflection of light from a specular surface, light rays are oriented parallel with each other and are propagating in the same direction. Other applications of polarized light include rejecting multipath reflections of objects based on the polarization of the reflected image of an object being different from the polarization of the actual image of the object. Industrial applications of polarized light may include detecting defects of manufactured objects.

Spectroscopy is also an important characteristic that may be used for sensing in a variety of fields, including space-based imaging, remote sensing, military target tracking, landmine detection, ballistic-missile detection, environmental monitoring, healthcare, forensics, farming, and surveying and mapping. Typical compact spectrometers may be larger than a few cubic millimeters in volume and disperse light using dispersive elements, i.e., a grating and a prism, or by using just filter arrays.

SUMMARY

An example embodiment provides a polarizing device for an imaging device that may include a light-polarizing device that may include a wire grid and an array of phase-modulating nanostructures. The light-polarizing device may polarize incident light into a predetermined linear direction. The array of phase-modulating nanostructures may be formed on the wire grid. The array of phase-modulating nanostructures may change a phase of the incident light a predetermined amount of phase change. In one embodiment, the array of phase-modulating nanostructures may include an array of high-dielectric-index nanostructures. The predetermined amount of phase change of a phase-modulating nanostructure may be based on a first width and a second width of the phase-modulating nanostructure in which the first width is perpendicular to the second width.

An example embodiment provides a polarizing device for an imaging device that may include a light-polarizing device that may include a wire grid and an array of phase-modulating nanostructures. The light-polarizing device may polarize incident light into a predetermined linear direction. The wire grid may include at least one wire that may include a series of metal-insulator-metal wire structures. The array of phase-modulating nanostructures may be formed on the wire grid and may change a phase of the incident light a predetermined amount of phase change. In one embodiment, at least one metal-insulator-metal wire structure of the series of metal-insulator-metal structures includes one of polysilicon, aluminum oxide, silicon dioxide and titanium oxide as an insulator. In one embodiment, the array of phase-modulating nanostructures may include an array of high-dielectric-index nanostructures.

An example embodiment provides a polarizing device for an imaging device that may include a light-polarizing device that may include a wire grid and an array of phase-modulating nanostructures. The light-polarizing device may polarize incident light into a predetermined linear direction. At least one wire of the wire grid may include a metal-insulator-metal wire structure. The array of phase-modulating nanostructures may be formed on the wire grid. The array of phase-modulating nanostructures may change a phase of the incident light a predetermined amount of phase change. The array of phase-modulating nanostructures may include an array of high-dielectric-index nanostructures in which the predetermined amount of phase change of a phase-modulating nanostructure may be based on a first width and a second width of the phase-modulating nanostructure in which the first width may be perpendicular to the second width.

BRIEF DESCRIPTION OF THE DRAWING

In the following section, the aspects of the subject matter disclosed herein will be described with reference to exemplary embodiments illustrated in the figure, in which:

FIG. 1C depicts unpolarized light passing through a vertically polarizing filter;

FIG. 1D depicts an equivalent representation of FIG. 1C;

DETAILED DESCRIPTION

Figures 1A, 1B:
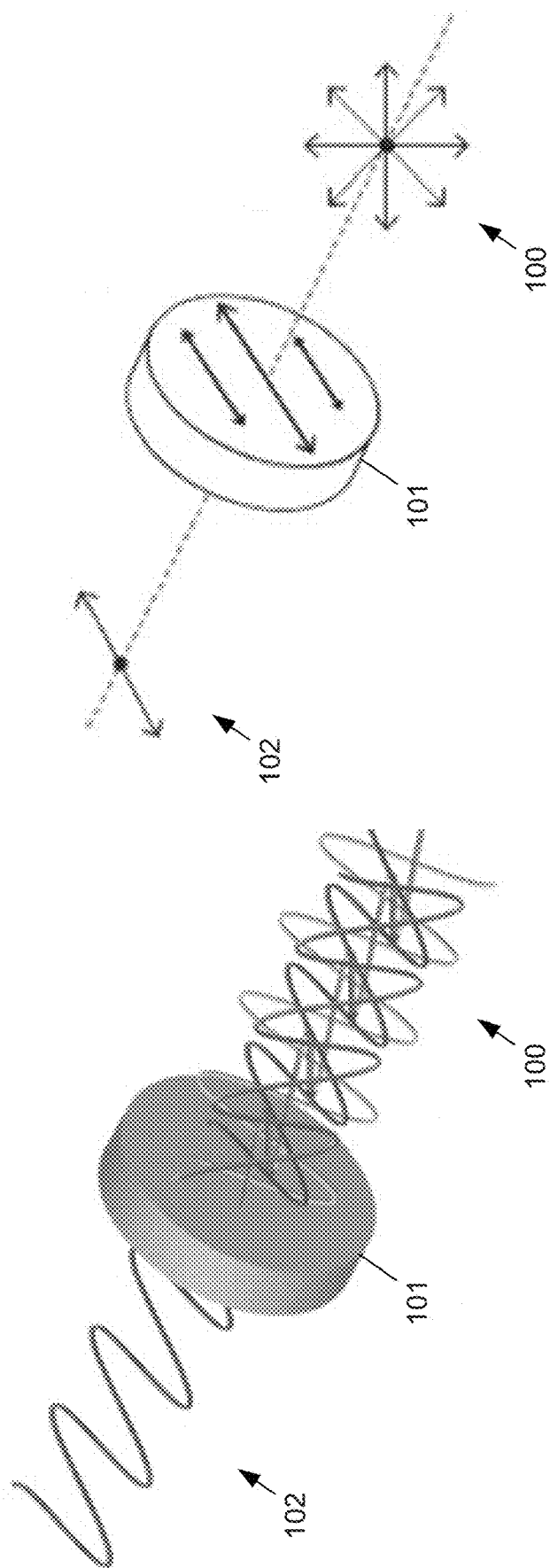
FIG. 1A depicts unpolarized light passing through a horizontally polarized filter.
FIG. 1B depicts an equivalent representation of FIG. 1A.
Figure 1E:
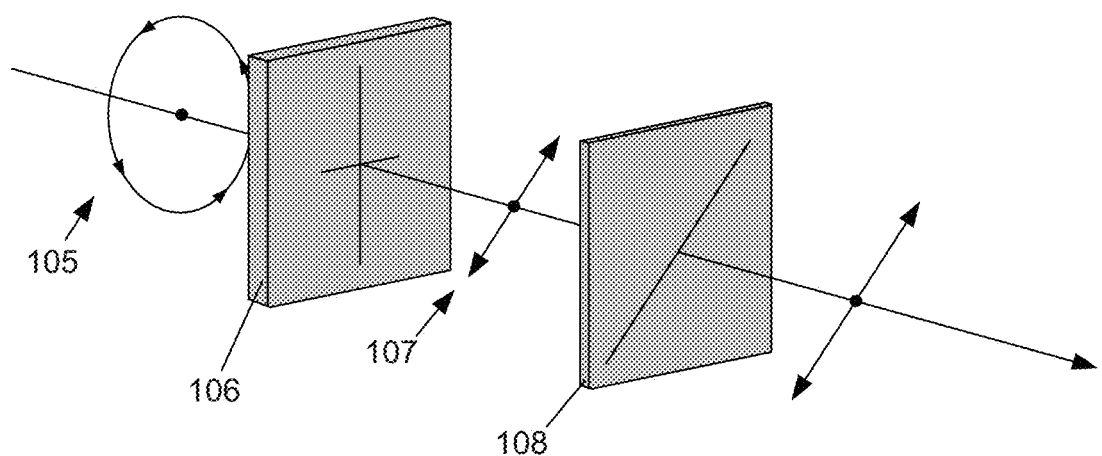
FIG. 1E depicts an example in which light has been circularly polarized with respect to two orthogonal directional axes.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The subject matter disclosed herein provides an on-chip (multi/hyper) spectral polarization imaging device that detects the complete polarization state and spectral information of a captured image, provides a high spectral resolution and a high field of view (FOV), is ultrafast and has high efficiency, and may be used for a wide variety of applications, such as, but not limited to autonomous, industrial and healthcare applications. In one embodiment, the subject matter disclosed herein provides a full Stokes-polarization imaging device together with multispectral image sensors without using a micro-lens array on top of each pixel of the multispectral image sensors. The phase and polarization of light may also be modulated simultaneously to improve angle-dependent FOV properties of the multi/hyper spectral sensors. A single image capture may provide simultaneous and ultrafast linear and circular polarization information and multispectral imaging.

Figure 2:
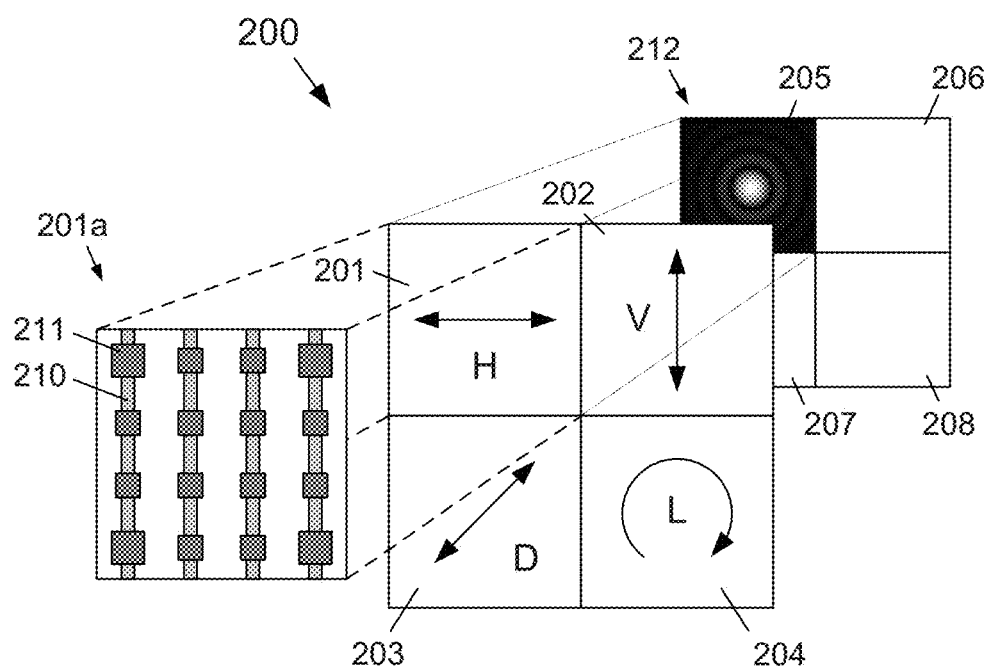
FIG. 2 depicts an example embodiment of an arrangement of four polarizing filters with respect to four pixels that may be used to detect six polarization states according to the subject matter disclosed herein.

FIG. 2 depicts an example embodiment of an arrangement 200 of four polarizing filters 201-204 with respect to four pixels 205-208 that may be used to detect six polarization states according to the subject matter disclosed herein. The four polarizing filters 201-204 respectively correspond to the four pixels 205-208. Each respective pixel 205-208 includes a photodetector. The filter 201 (H) horizontally polarizes light passing through the filter 201. The filter 202 (V) vertically polarizes light. The filter 203 (D) diagonally polarizes light, and the filter 204 (L) circularly polarizes light. In an alternative embodiment, six polarizing filters and six pixels may be used. The additional two polarizing filters would be an anti-diagonally polarizing filter and a circularly polarizing filter that would polarize light in the opposite circular direction from the circularly polarizing filter 204.

Additional details of the polarizing filter 201 are depicted at 201a, which depicts a top view of the polarizing filter 201. The polarizing filter 201 includes a wire grid 210, of which only one wire of the wire grid is indicated, and one or more phase-modulating nanostructures, or metasurfaces, 211, of which only one nanostructure is indicated. The wires of the wire grid may include a metal-insulator-metal (MIM) structure that suppresses reflection from cross-polarization. The nanostructures 211 may be formed from a high dielectric index material, such as silicon (a Si, c Si, p-Si), silicon nitride ($Si_3N_4$), titanium dioxide ($TiO_2$), Gallium nitride (GaN), Zinc oxide (ZnO), hafnium silicate, zirconium silicate, hafnium dioxide and zirconium dioxide. The nanostructures 211 may also reduce the backscattering of the incident light, and may also help detect circular polarization.

The wire grid 210 horizontally polarizes the light passing through the polarizing filter, and the nanostructures 211 change, or modulate, the phase of the light that passes through the polarizing filter. The pattern of light that is generated by the polarizing filter 201 and that is focused at the pixel 205 is depicted at 212. The other polarizing filters 202-204 also include a wire grid (not shown) having a series of metal-insulator-metal (MIM) structure and one or more nanostructures (also not shown). The nanostructures of the circularly polarizing filter 204 provide a 90-degree phase shift so that the circularly polarizing filter operates as a quarter wave plate.

The arrangement 200 of the four polarizing filters 201-204 and the four pixels 205-208 may be used to generate the following six polarization states for incident light.

$$I_H = I_H \tag{1}$$

$$I_V = I_V \tag{2}$$

$$I_D = I_D \tag{3}$$

$$I_A = I_H + I_V - I_D \tag{4}$$

$$I_R = I_H + I_V - I_L \tag{5}$$

$$I_L = I_L \tag{6}$$

in which $I_H$ is the light intensity parameter of horizontally polarized light (H) measured at pixel 205, $I_V$ is the light intensity parameter of the vertically polarized light (V) measured at pixel 206, $I_D$ is the light intensity parameter of the diagonally polarized light (D) measured at pixel 207, $I_A$ is the intensity parameter of the anti-diagonally polarized light, $I_R$ is the intensity parameter of the right-hand circularly polarized light, and $I_L$ is the light intensity parameter of the left-hand circularly polarized light (L) measured at pixel 208.

Using the intensity parameters of Eqs. (1)-(6), the Stokes parameters $S_0$, $S_1$, $S_2$ and $S_3$ may be calculated as follows.

$$S_0 = I_H + I_V \tag{7}$$

$$S_1 = I_H - I_V \tag{8}$$

$$S_2 = 2*I_D - S_0 \tag{9}$$

$$S_3 = 2*I_L - S_0 \tag{10}$$

$$DoLP = \frac{\sqrt{S_1^2 + S_2^2}}{S_0} \tag{11}$$

$$AoLP = \frac{1}{2}\tan^{-1}\frac{S_2}{S_1} \tag{12}$$

in which $S_0$ is the total intensity of a light beam, DoLP is the degree of linear polarization, and AoLP is the angle of linear polarization, $E_{0x}$ is the magnitude of the electric field of the light in the x direction, $E_{0x}$ is the magnitude of the electric field of the light in the y direction, and $\delta$ is the angle of inclination of the electric field of the light with respect to the x-axis.

Figure 3B:
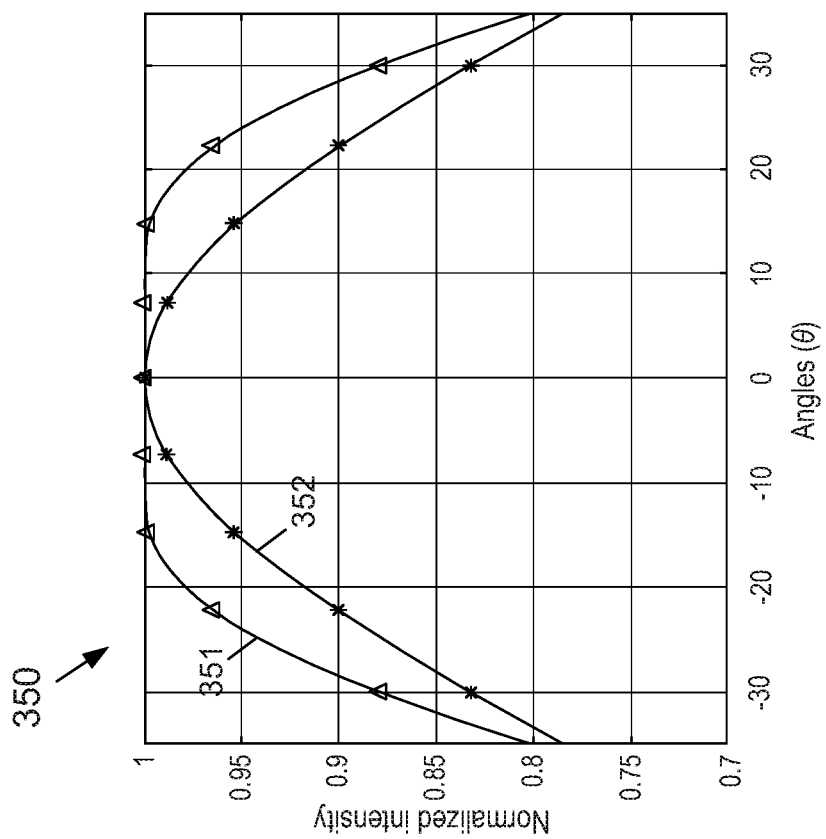
FIG. 3B is a graph of normalized intensity at a pixel as a function of the field of view angle of a polarized filter that includes nanostructures according to the subject matter disclosed herein.
Figure 3A:
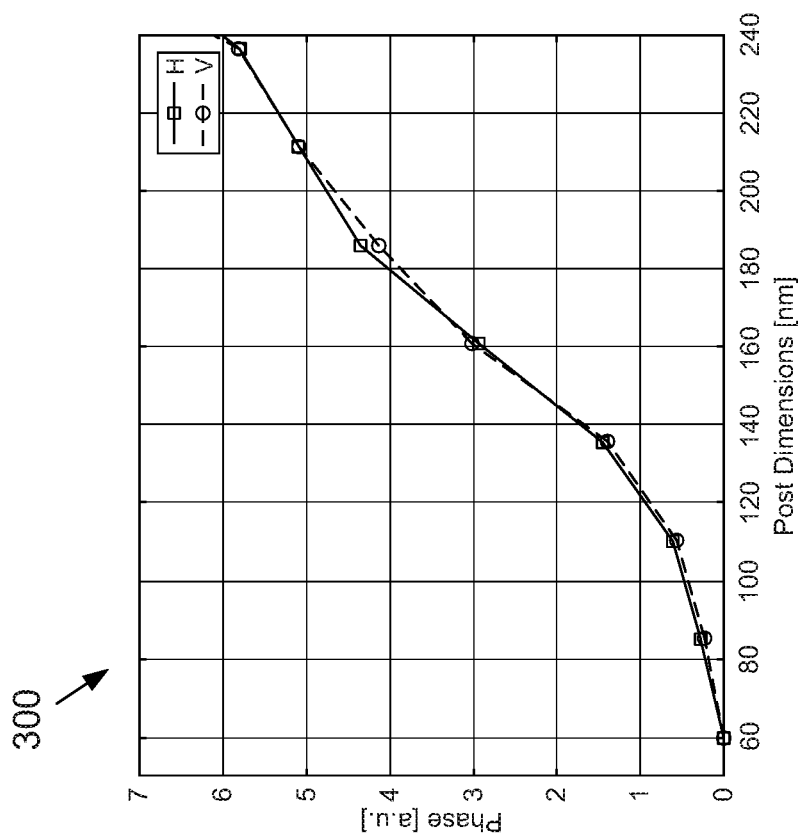
FIG. 3A is a graph of phase as a function of Cartesian dimensions of a nanostructure according to the subject matter disclosed herein.

FIG. 3A is a graph 300 of phase as a function of Cartesian dimensions of a nanostructure 211 according to the subject matter disclosed herein. The abscissa of graph 300 is the dimensions of a nanostructure in nm. Both horizontal and vertical dimensions are plotted. The ordinate of graph 300 is phase is in arbitrary units (a.u.). By changing the dimensions of the nanostructures, a full 2πc phase shift may be obtained to modulate the wave front of the light for focusing purposes and angle-independence properties of a polarizing filter may be increased, thereby resulting in a greater efficiency of the pixels of an image sensor.

FIG. 3B is a graph 350 of normalized intensity at a pixel as a function of the field of view (FOV) angle of a polarized filter that includes nanostructures according to the subject matter disclosed herein. The abscissa of graph 350 is FOV angle in degrees and the ordinate is normalized intensity. The curve 351 represents the normalized intensity at a pixel, such as pixel 205, as a function of field of view (FOV) angle of a polarized filter, such as polarized filter 201, which includes the nanostructures 211 that change, or modulate, the phase of the light to focus the light at the pixel. As can be seen, the curve 351 has a FOV of ±15 degrees, that is, a FOV of 30 degrees, whereas as a comparison, curve 352 represents the normalized intensity at a pixel provides by a typical polarized filter that does not include phase-modulating nanostructures 211.

Figure 4A:
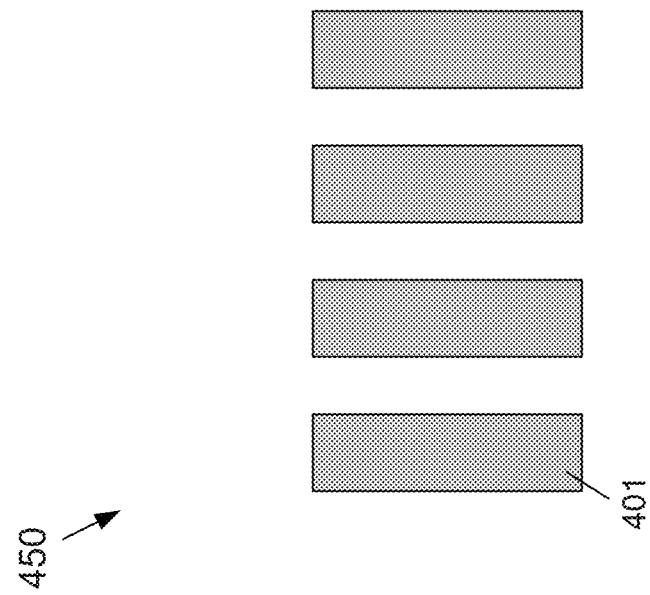
FIG. 4A depicts a cross-sectional view of a wire grid having an MIM structure that suppresses reflection from cross-polarization according to the subject matter disclosed herein.
Figure 4B:
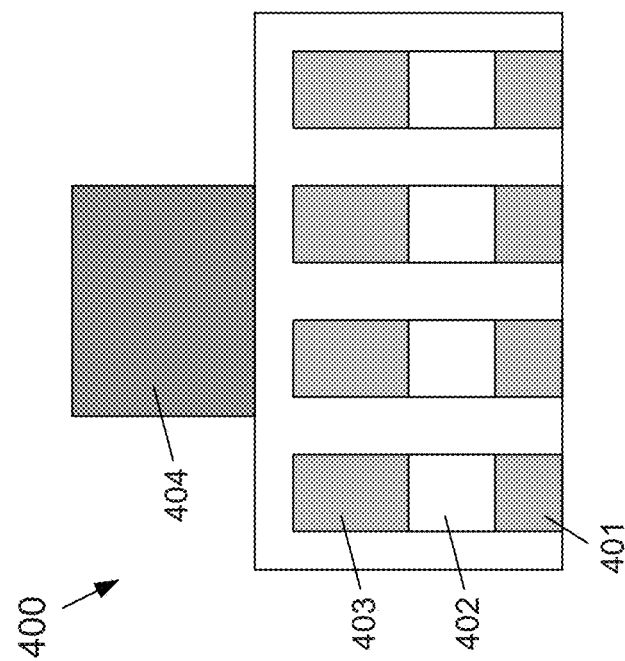
FIG. 4B depicts a cross-sectional view of a typical wire grid having wires formed from a metal.

FIG. 4A depicts a cross-sectional view of a wire grid 400 having a metal-insulator-metal (MIM) structure that suppresses reflection from cross-polarization according to the subject matter disclosed herein. FIG. 4B depicts a cross-sectional view of a typical wire grid 450 that does not include an MIM structure and does not suppress reflections. The MIM structure of the wire grid 400 of FIG. 4A includes a first metal wire layer 401, a dielectric layer 402, and a second metal wire layer 403. A phase-modulating nanostructure 404 is shown formed on the wire grid 400. Although only a single MIM structure is depicted in FIG. 4A, in alternative embodiments multiple MIM structures may be used that are stacked on each other. For example, if two MIM structures were to be stacked on each other, the resulting structure would be an MIMMIM structure. The two middle M layers could be formed from the same metal material or from different metal materials.

The first and second wire layers 401 and 403 may be formed from any metal or doped semiconductor, such as, but not limited to, aluminum (Al), gold (Au), silver (Ag), titanium (Ti), tungsen (W), copper (Cu), palladium (Pd), tantalum (Ta), tantalum nitride (TaN), Niobium (Nb) and p-doped silicon (p-Si). The dielectric layer 402 may be formed from any dielectric material like oxides, such as, but not limited to, aluminum oxide ($Al_2O_3$), silicon dioxide ($SiO_2$), silicon nitride ($Si_3N_4$), titanium dioxide ($TiO_2$), zinc oxide (ZnO), hafnium silicate ($HfSiO_4$), zirconium silicate ($ZrSiO_4$), hafnium dioxide ($HfO_2$), and zirconium dioxide ($ZrO_2$) and/or semiconductors, like silicon (a-Si, p-Si). In one embodiment, the thickness t of the dielectric layer 402 may range from about a few nanometers to a few hundred nanometers. FIG. 4B depicts a cross-sectional view of a typical wire grid 450 having wires 451 formed from a metal, such as aluminum.

Tables 1 and 2 below respectively set forth transmission (T), reflection (R) and absorption (A) characteristics of the wire grid 400 in FIG. 4A at a wavelength of 800 nm, and for the typical wire grid 450 in FIG. 4B. In Tables 1 and 2, both the wire grid 400 and the typical wire grid 450 are oriented for horizontal polarization. Similar characteristics may be obtained for wire grids oriented for vertical or diagonal polarization.

TABLE 1

| Polarization | T (%) | R (%) | A (%) |
| --- | --- | --- | --- |
| X | ~96 | ~1 | ~3.5 |
| Y | ~0.5 | ~4 | ~95.5 |

TABLE 2

| Polarization | T (%) | R (%) | A (%) |
| --- | --- | --- | --- |
| X | ~96 | ~4 | ~0 |
| Y | ~1 | ~90 | ~9 |

Both Tables 1 and 2 show that the percentage transmission of horizontally polarized light (i.e., in the X direction) is about 96%, whereas the percentage of transmission of vertically polarized light (i.e., in the Y direction) is small (i.e., about 0.5% and about 1%). The percentage reflection of the horizontally polarized light is about 1% for the wire grid 400, and is about 4% for the typical wire grid 450. The percentage reflection is about 4% for the wire grid 400 having an MIM structure, whereas the percentage reflection for the typical wire grid 450 is about 90%. Thus, the MIM structure significantly reduces the amount of reflection in comparison to a typical wire grid. Further, the percentage absorption of light for the wire grid 400 having the MIM structure is about 3.5% in the X direction and about 95.5% in the Y direction. In contrast, the typical wire grid 450 exhibits virtually no absorption of light in the X direction and only about 9% in the Y direction. The significant reduction in reflection and the increase is absorption provided by the MIM structure may significantly reduce ghosting in a captured image.

Figure 5:
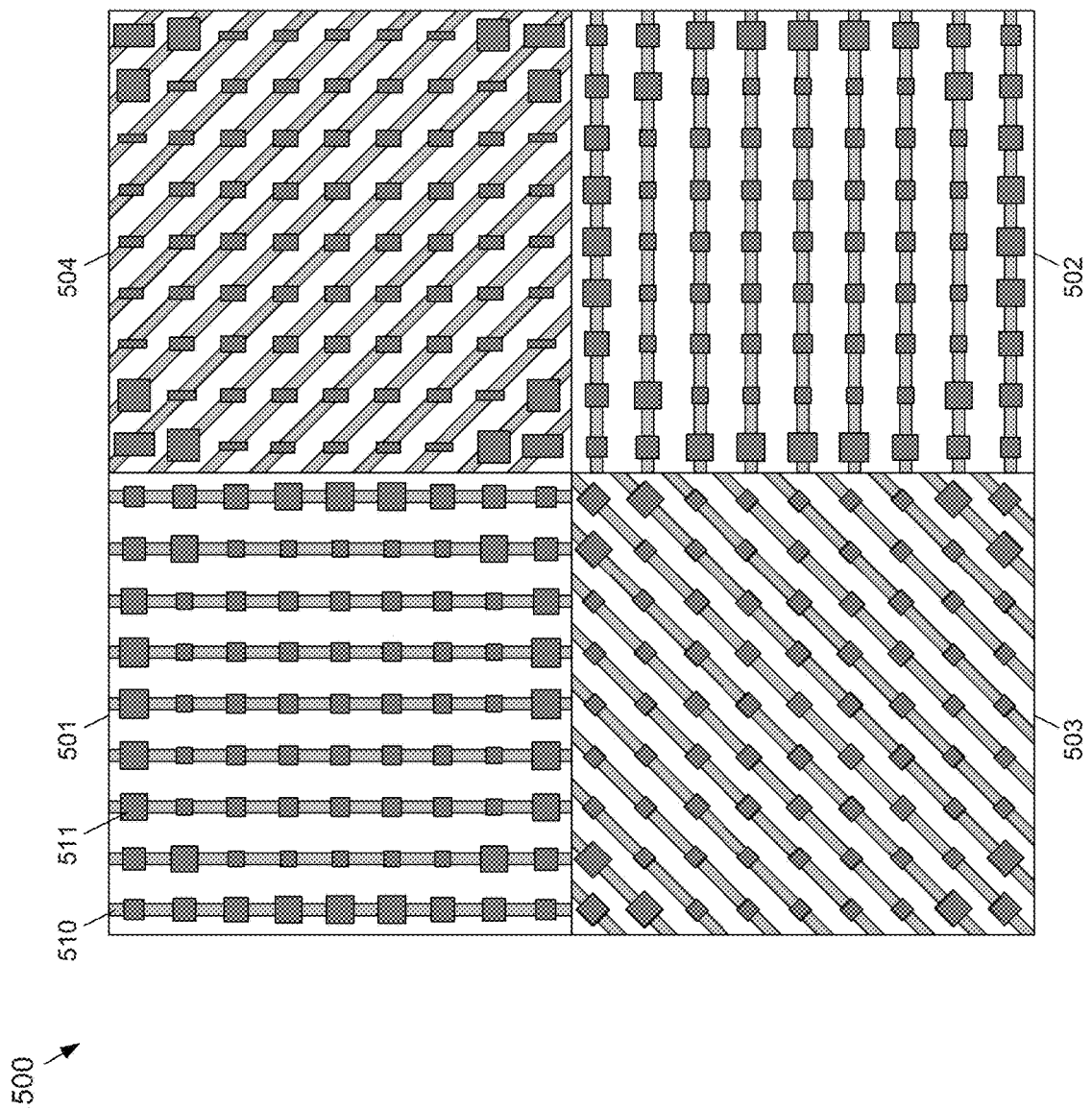
FIG. 5 depicts a top view of an example embodiment of polarizer that may be used to detect six polarization states according to the subject matter disclosed herein.

FIG. 5 depicts a top view of an example embodiment of polarizer 500 that may be used to detect six polarization states according to the subject matter disclosed herein. The polarizer 500 includes four polarizing filters 501-504 that each corresponds to a pixel (not shown) of an image sensor (not shown). The filter 501 horizontally polarizes light passing through the filter 501. The filter 502 vertically polarizes light. The filter 503 diagonally polarizes light, and the filter 504 circularly polarizes light.

Each of the filters 501-504 includes a wire grid 510 having an MIM structure and one or more phase-modulating nanostructures 511, although the wire grid and the phase-modulating nanostructures are only indicated for the filter 501. The horizontal and vertical dimensions of the phase-modulating nanostructured 511 may be varied based on the graph 300 in FIG. 3A to achieve a desired focusing. For example, the phase-modulating nanostructures 511 are depicted as being generally square for the polarizing filters 501-503, but having different horizontal and vertical dimensions depending upon the position of the nanostructure on the polarizing filter. The phase-modulating nanostructures of the circularly polarizing filter 504 may be generally square or rectangular depending upon the position of the nanostructure on the polarizing filter.

The arrangement of the polarizing filters 501-504, in which the horizontally polarizing filter 501 is in the upper-left corner of the polarizer 500, the vertically polarizing filter 502 in the lower-right corner, the diagonally polarizing filter 503 in the lower-left corner, and the circularly polarizing filter 504 is in the upper-right corner, is an example arrangement and other arrangements are possible. In an alternative example embodiment, two additional polarizing filters, such as an anti-diagonally polarizing filter and a circularly polarizing filter that would polarize light in the opposite circular direction from the circularly polarizing filter 504, may be included in the polarizer 500. Such an alternative embodiment would also use two additional pixels.

Figure 6:
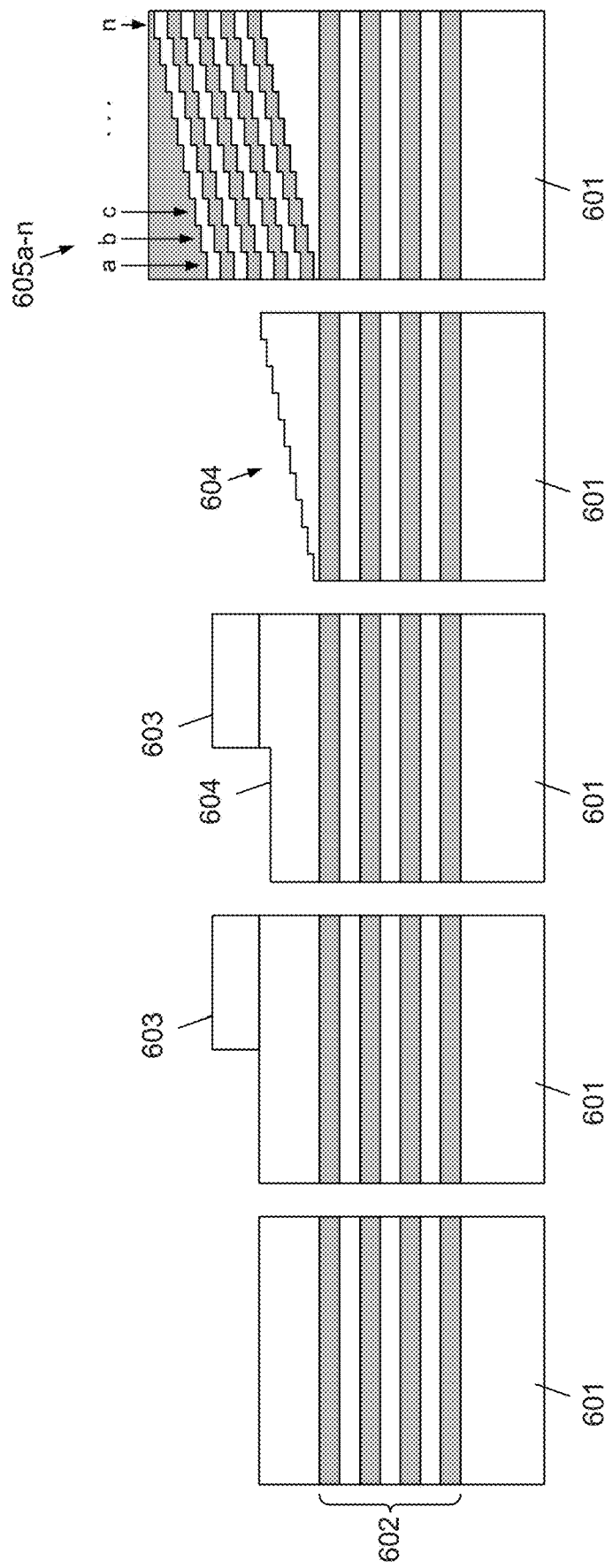
FIGS. 6A-6E depicts a cross-sectional view of an example sequence of forming different spectral filters on an array of photodiodes according to the subject matter disclosed herein.

Different spectral filters may be positioned in alignment with, for example, one or more polarizers 500, so that the Stokes parameters may be determined for light of different spectral ranges. FIGS. 6A-6E depicts a cross-sectional view of an example sequence of forming different spectral filters on an array of photodiodes according to the subject matter disclosed herein. The polarizers 500 are not shown in FIGS. 6A-6E; however, the polarizers 500 may be placed on either side of the spectral filters in the light path. In FIG. 6A, a bottom distributed Bragg reflector (DBR) 602 is formed on a substrate 601 that includes an array of photodiodes (not shown). In one embodiment, the bottom DBR 602 may be formed from alternating layers of $SiO_2$ and $TiO_2$. In FIGS. 6B-6D, photolithography and patterned masks 603 may be used to form layers and/or cavities 604 having different heights, or thicknesses, that reflect correspondingly different wavelengths of light to form spectral filters 605a-n, as depicted in FIG. 6E. Each respective spectral filter may be arranged to be aligned with a polarizer 500 and a photodetector. It should be understood that the depiction of the spectral filters 605a-n in FIG. 6E is in only one direction or dimension. A cross-sectional view in another orthogonal direction may depict one or more additional spectral filters each covering a different spectral range.

Figure 7:
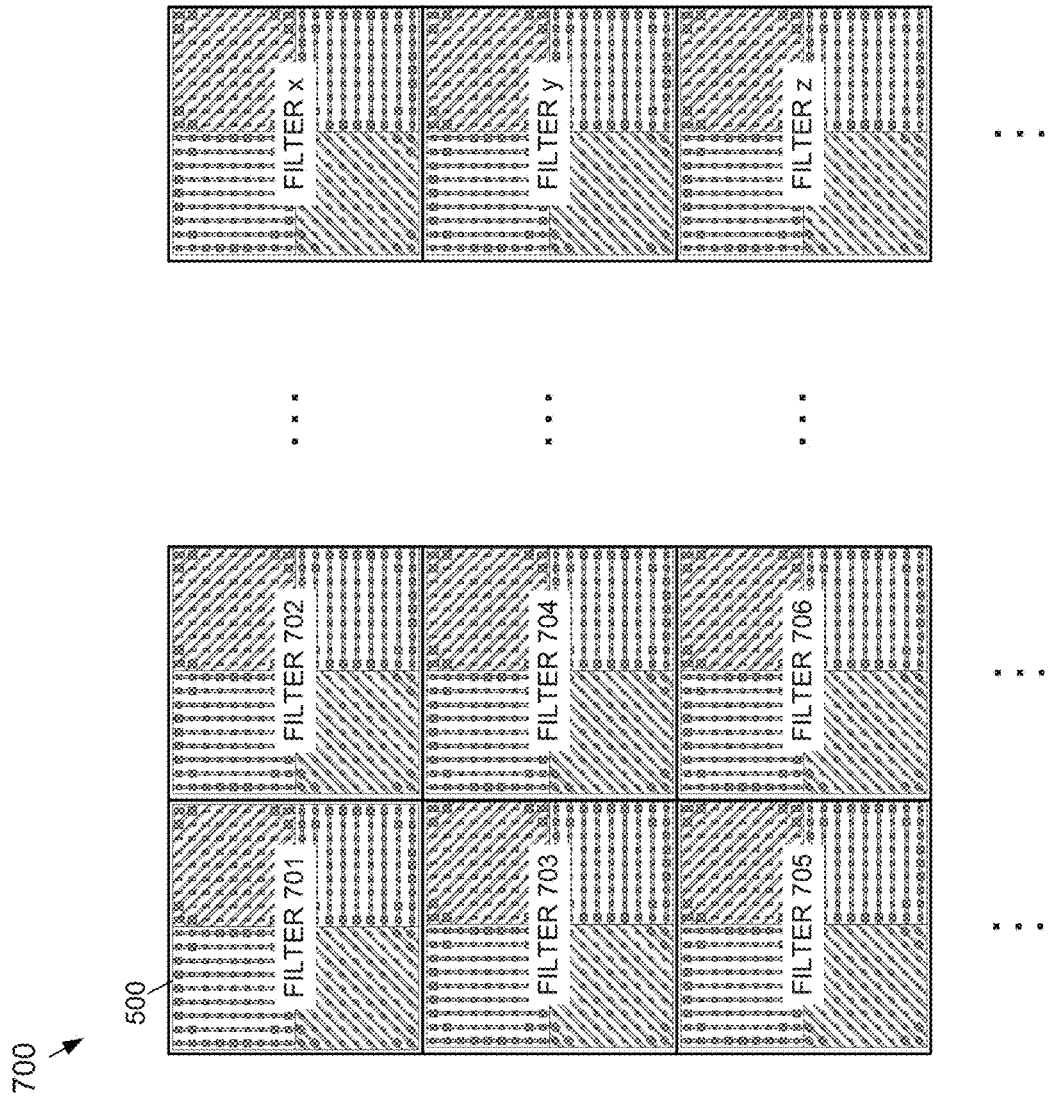
FIG. 7 depicts a top view of an example embodiment of an array of polarizing filters and different spectral filters that may be used with an image sensor to provide on-chip simultaneous full Stokes polarization parameters and multi/hyper spectral imaging according to the subject matter disclosed herein.

FIG. 7 depicts a top view of an example embodiment of an array 700 of polarizing filters and different spectral filters that may be used with an image sensor to provide on-chip simultaneous full Stokes polarization parameters and multi/hyper spectral imaging according to the subject matter disclosed herein. The array of polarizing filters may include the example embodiment of the polarizer 500. Different spectral filters may be arranged in optical alignment with different polarizers 500. For example, a first filter 701 may be optically aligned with a polarizer 500, and so on.

Figure 8:
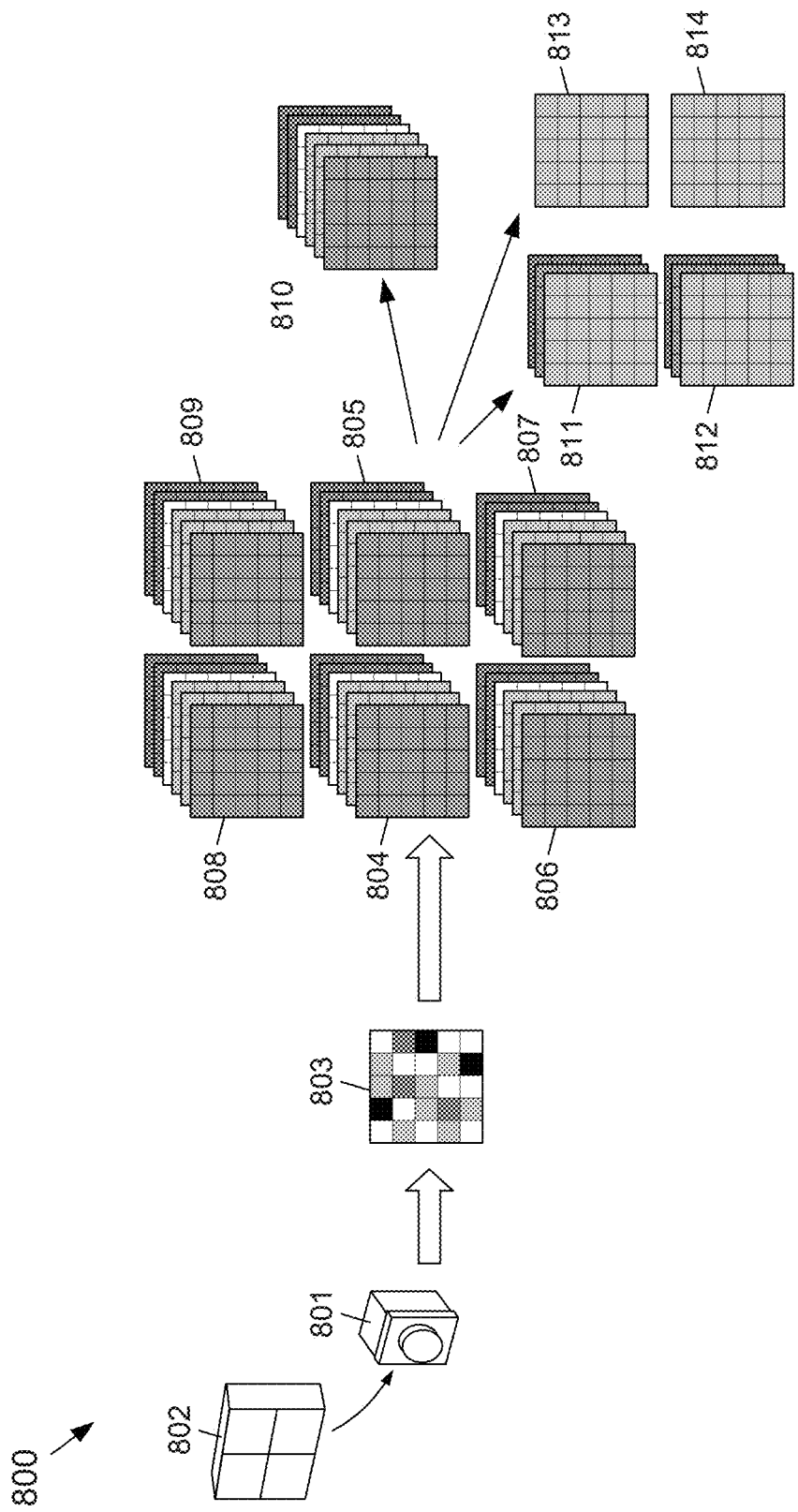
FIG. 8 depicts an imaging system that may include polarizing filters and spectral filters that provide on-chip simultaneous full Stokes polarization parameters (both linear and circular polarization) and multi/hyper spectral imaging according to the subject matter disclosed herein.

FIG. 8 depicts an imaging system 800 that may include polarizing filters and spectral filters that provide on-chip simultaneous full Stokes polarization parameters (both linear and circular polarization) and multi/hyper spectral imaging according to the subject matter disclosed herein. The imaging system 800 may include a camera 801 having an image sensor (not shown). The image sensor may include polarizing and spectral filters 802, as disclosed herein. An image captured by the image sensor may be processed as a grayscale image 803 and demosaiced. Additionally, the captured image may be processed to generate images corresponding to multispectral linear and circularly polarized light that passes through the polarizing and spectral filters 802. For example, depending upon the particular polarizing and spectral filters 802 that are used, the captured image may generate multispectral horizontally polarized images 804, multispectral vertically polarized images 805, diagonally (45 degrees) polarized images 806, anti-diagonally polarized images 807, right-hand circularly polarized images 808, and left-hand circularly polarized images 809. Parameters determined from the linearly and circularly polarized images 804-809 may be used to generate full Stokes parameters for the light of the image.

Further, the captured image may be processed to generate non-polarized multispectral images 810, and/or red (R), green (G) and blue (B) images 811. If the multispectral filters include filters for infrared (IR), multispectral IR images 812 may be generated by the imaging system 800. Images may be generated that indicate the degree of linear polarization (DoLP) 813 and the degree of circular polarization (DoCP) 814 may also be generated.

Figure 9:
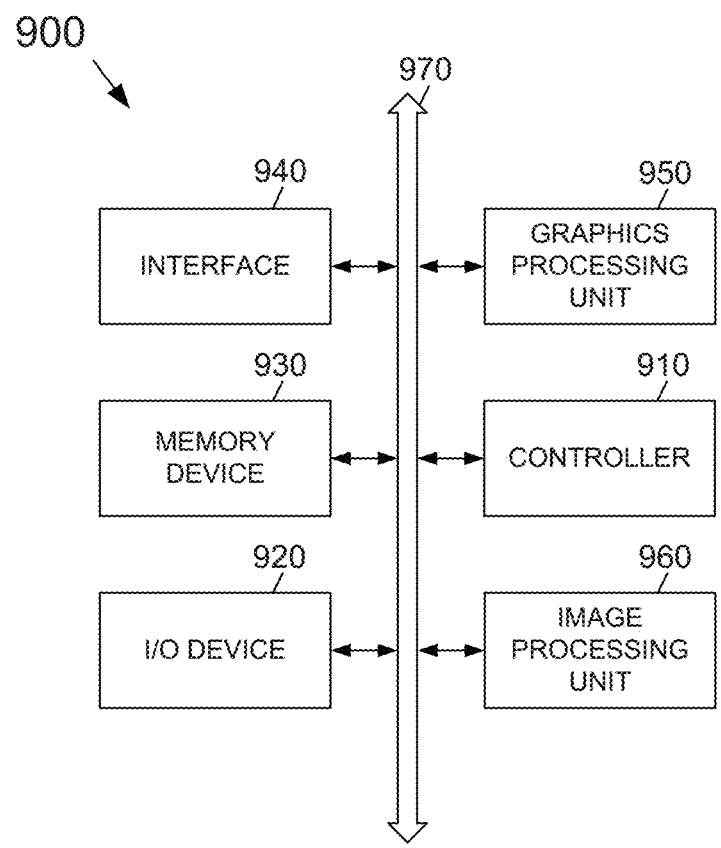
FIG. 9 depicts an electronic device that includes an image sensor having polarizing filters and spectral filters according to the subject matter disclosed herein.

FIG. 9 depicts an electronic device 900 that includes an image sensor having polarizing filters and spectral filters according to the subject matter disclosed herein. Electronic device 900 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 900 may also be part of, but not limited to, an ADAS, a mobile-device imaging system, an industrial imaging system, robotics, etc. The electronic device 900 may include a controller 910, an input/output device 920 such as, but not limited to, a keypad, a keyboard, a display, a touch-screen display, a camera, and/or an image sensor, a memory 930, an interface 940, a GPU 950, and an imaging processing unit 960 that are coupled to each other through a bus 970. The controller 910 may include, for example, at least one microprocessor, at least one digital signal processor, at least one microcontroller, or the like. The memory 930 may be configured to store a command code to be used by the controller 910 or a user data.

Electronic device 900 and the various system components of electronic device 900 may include the image processing unit 960, which includes an image sensor having polarizing filters and spectral filters according to the subject matter disclosed herein. The interface 940 may be configured to include a wireless interface that is configured to transmit data to or receive data from a wireless communication network using a RF signal. The wireless interface 940 may include, for example, an antenna, a wireless transceiver and so on. The electronic system 900 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A polarizing filter comprising:
   a wire grid comprising multiple wire elements, each wire element being spaced from an adjacent wire element and extending across the polarizing filter along a longitudinal axis of the wire element; and
   an array of phase-modulating nanostructures formed on the wire grid, the array of phase-modulating nanostructures changing a phase of incident light a predetermined amount of phase change, each phase-modulating nanostructure being located in the array with respect to a corresponding wire element and in alignment with other phase-modulating nanostructures along the longitudinal axis of the corresponding wire element, each phase-modulating nanostructure comprising a square or a rectangular shape, a first width and a second width, the first width being perpendicular to the second width, and the first width and the second width of each phase-modulating nanostructure varying with respect to the first width and the second width of other phase-modulating nanostructures of the array based on a location of the phase-modulating nanostructure in the array.

2. The polarizing filter of claim 1, wherein a field of view of the polarizing filter is 30 degrees for a normalized intensity of 1.

3. The polarizing filter of claim 1, further comprising a spectral filter that passes a predetermined range of wavelengths of the incident light.

4. The polarizing filter of claim 1, wherein the polarizing filter is part of a polarizing device comprising:
   a first polarizing filter that polarizes incident light into a first direction;
   a second polarizing filter that polarizes incident light into a second direction, the first and second directions being orthogonal to each other;
   a third polarizing filter that polarizes incident light into a third direction; and
   a fourth polarizing filter that polarizes incident light into a fourth direction, the third and fourth directions being orthogonal to each other and being rotated 45 degrees from the first and second directions,
   the first, second, third and fourth polarizing filters each respectively comprising:
      a wire grid comprising multiple wire elements, each wire element being spaced from an adjacent wire element and extending across the corresponding polarizing filter along a longitudinal axis of the wire element; and
      an array of phase-modulating nanostructures formed on the wire grid, the array of phase-modulating nanostructures changing a phase of incident light a predetermined amount of phase change, each phase-modulating nanostructure being located in the array with respect to a corresponding wire element and in alignment with other phase-modulating nanostructures along the longitudinal axis of the corresponding wire element, each phase-modulating nanostructure comprising a square or a rectangular shape, a first width and a second width, the first width being perpendicular to the second width, and the first width and the second width of each phase-modulating nanostructure varying with respect to the first width and the second width of other phase-modulating nanostructures of the array based on a location of the phase-modulating nanostructure in the array.

5. The polarizing filter of claim 4, wherein the first, second, third and fourth directions respectively comprise a vertical direction, a horizontal direction, a diagonal direction and an anti-diagonal direction.

6. The polarizing filter of claim 1, wherein the predetermined amount of phase change of a phase-modulating nanostructure is based on the first width and the second width of the phase-modulating nanostructure.

7. The polarizing filter of claim 6, wherein the array of phase-modulating nanostructures comprises an array of high-dielectric-index nano structures.

8. The polarizing filter of claim 7, wherein at least one wire element of the wire grid comprises a metal-insulator-metal wire structure.

9. A polarizing filter comprising:
a wire grid comprising multiple wire elements, each wire element comprising a metal-insulator-metal wire structure that is spaced from an adjacent wire element and that extends across the polarizing filter along a longitudinal axis of the wire element; and
an array of phase-modulating nanostructures formed on the wire grid, the array of phase-modulating nanostructures changing a phase of incident light a predetermined amount of phase change, each phase-modulating nanostructure being located in the array with respect to a corresponding wire element and in alignment with other phase-modulating nanostructures along the longitudinal axis of the corresponding wire element, each phase-modulating nanostructure comprising a square or a rectangular shape, a first width and a second width, the first width being perpendicular to the second width, and the first width and the second width of each phase-modulating nanostructure varying with respect to the first width and the second width of other phase-modulating nanostructures of the array based on a location of the phase-modulating nanostructure in the array.

10. The polarizing filter of claim 9, wherein a field of view of the polarizing filter is 30 degrees for a normalized intensity of 1.

11. The polarizing filter of claim 9, further comprising a spectral filter that passes a predetermined range of wavelengths of the incident light.

12. The polarizing filter of claim 9, wherein the polarizing filter is part of a polarizing device comprising:
a first polarizing filter that polarizes incident light into a first direction;
a second polarizing filter that polarizes incident light into a second direction, the first and second directions being orthogonal to each other;
a third polarizing filter that polarizes incident light into a third direction; and
a fourth polarizing filter that polarizes incident light into a fourth direction, the third and fourth directions being orthogonal to each other and being rotated 45 degrees from the first and second directions,
the first, second, third and fourth polarizing filters each respectively comprising:
a wire grid comprising multiple wire elements, each wire element comprising a metal-insulator-metal wire structure that is spaced from an adjacent wire element and that extends across the polarizing filter along a longitudinal axis of the wire element; and
an array of phase-modulating nanostructures formed on the wire grid, the array of phase-modulating nanostructures changing a phase of incident light a predetermined amount of phase change, each phase-modulating nanostructure being located in the array with respect to a corresponding wire element and in alignment with other phase-modulating nanostructures along the longitudinal axis of the corresponding wire element, each phase-modulating nanostructure comprising a square or a rectangular shape, a first width and a second width, the first width being perpendicular to the second width, and the first width and the second width of each phase-modulating nanostructure varying with respect to the first width and the second width of other phase-modulating nanostructures of the array based on a location of the phase-modulating nanostructure in the array.

13. The polarizing filter of claim 12, wherein the first, second, third and fourth directions respectively comprise a vertical direction, a horizontal direction, a diagonal direction and an anti-diagonal direction.

14. The polarizing filter of claim 9, wherein at least one metal-insulator-metal wire structure includes one of polysilicon, aluminum oxide, silicon dioxide and titanium oxide as an insulator.

15. The polarizing filter of claim 14, wherein the predetermined amount of phase change of a phase-modulating nanostructure is based on the first width and the second width of the phase-modulating nanostructure.

16. The polarizing filter of claim 15, wherein the array of phase-modulating nanostructures comprises an array of high-dielectric-index nano structures.

17. A polarizing filter comprising:
a wire grid comprising multiple wire elements, at least one wire element comprising a metal-insulator-metal wire structure, and each wire element being spaced from an adjacent wire element and extending across the polarizing filter along a longitudinal axis of the wire element; and
an array of phase-modulating nanostructures formed on the wire grid, the array of phase-modulating nanostructures changing a phase of incident light a predetermined amount of phase change, the array of phase-modulating nanostructures comprising an array of high-dielectric-index nanostructures, each phase-modulating nanostructure being located in the array with respect to a corresponding wire element and in alignment with other phase-modulating nanostructures along the longitudinal axis of the corresponding wire element, and each phase-modulating nanostructure comprising a square or a rectangular shape, a first width and a second width, the first width being perpendicular to the second width, and the first width and the second width of each phase-modulating nanostructure varying with respect to the first width and the second width of other phase-modulating nanostructures of the array based on a location of the phase-modulating nanostructure in the array.

18. The polarizing filter of claim 17, further comprising a spectral filter that passes a predetermined range of wavelengths of the incident light.

19. The polarizing filter of claim 17, wherein the polarizing filter is part of a polarizing device comprising:
a first polarizing filter that polarizes incident light into a first direction;
a second polarizing filter that polarizes incident light into a second direction, the first and second directions being orthogonal to each other;
a third polarizing filter that polarizes incident light into a third direction; and
a fourth polarizing filter that polarizes incident light into a fourth direction, the third and fourth directions being orthogonal to each other and being rotated 45 degrees from the first and second directions,
the first, second, third and fourth polarizing filters each respectively comprising:
a wire grid comprising multiple wire elements, each wire element comprising a metal-insulator-metal wire structure that is spaced from an adjacent wire element and that extends across the polarizing filter along a longitudinal axis of the wire element; and an array of phase-modulating nanostructures formed on the wire grid, the array of phase-modulating nanostructures changing a phase of incident light a predetermined amount of phase change, the array of phase-modulating nanostructures comprising an array of high-dielectric-index nanostructures, each phase-modulating nanostructure being located in the array with respect to a corresponding wire element in alignment with the corresponding wire element along the longitudinal axis of the corresponding wire element, each phase-modulating nanostructure comprising a square or a rectangular shape, a first width and a second width, the first width being perpendicular to the second width, and the first width and the second width of each phase-modulating nanostructure varying with respect to the first width and the second width of other phase-modulating nanostructures of the array based on a location of the phase-modulating nanostructure in the array.

20. The polarizing filter of claim 19, wherein the first, second, third and fourth directions respectively comprise a vertical direction, a horizontal direction, a diagonal direction and an anti-diagonal direction.

\* \* \* \* \*